April 8, 1930.            S. D. PORT            1,754,042
CONNECTING LINK FOR CHAINS
Filed June 13, 1929
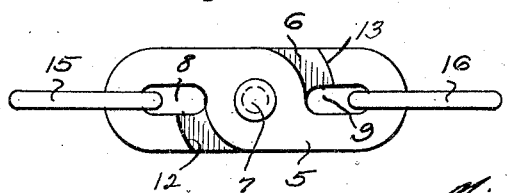
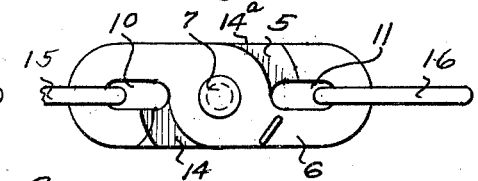
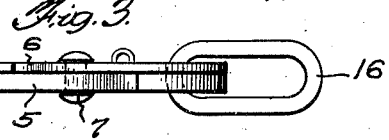
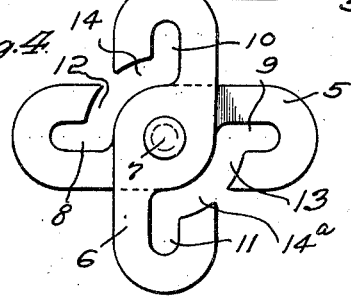
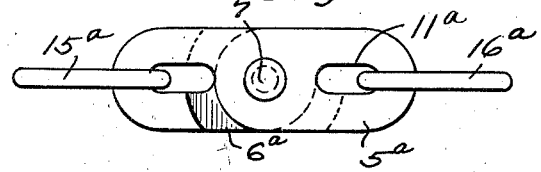
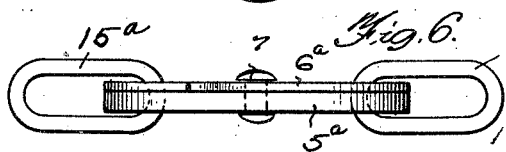
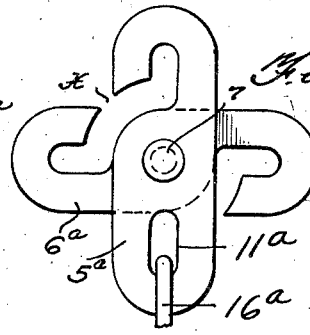
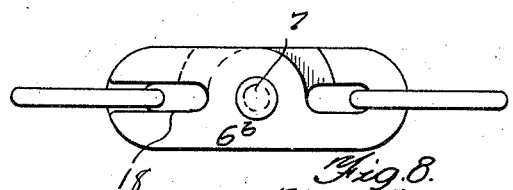
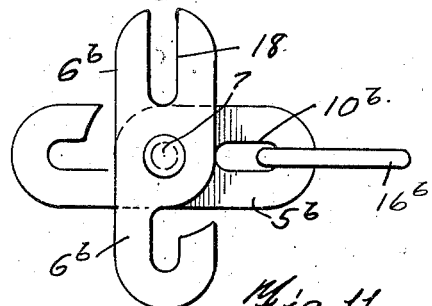
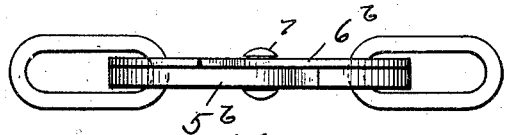
INVENTOR.
S. D. Port
BY Shepherd & Campbell
ATTORNEYS, Patented Apr. 8, 1930

1,754,042

UNITED STATES PATENT OFFICE

SIDNEY D. PORT, OF SAXTON, PENNSYLVANIA

CONNECTING LINK FOR CHAINS

Application filed June 13, 1929. Serial No. 370,624.

This invention relates to connecting links for chains, and it has for its object to provide a simple, inexpensive and easily manipulated structure, by means of which a link may be inserted in a chain, or the ends of two chain sections may be easily and quickly united.

In the accompanying drawing, I have illustrated three different forms in which my invention may be embodied, and it is to be understood that the invention includes within its purview any further modifications embodying the same principles and coming within the scope or structure of the appended claims.

For convenience in describing the invention, I will refer to one of the elements of each connector as a body link and the other element as a lock link. In the drawing, Figure 1 is a side elevation of a connector.

Figure 2 is a side elevation of the other side thereof.

Figure 3 is an underside plan view of the link of Figure 2.

Figure 4 is a view of the structure illustrated in Figure 2, with the elements of the connector moved to open position.

Figure 5 is a side elevation of a modified form of the invention.

Figure 6 is a plan view of the structure illustrated in Figure 5.

Figure 7 is a view of the structure of Figures 5 and 6, in open position.

Figure 8 is a side elevation of a further modification of the invention, looking from the lock link side of the device.

Figure 9 is a view of the structure of Figure 8, reversed by turning from end to end to expose the body link side of the structure.

Figure 10 is a plan view of the structure of Figure 9, and

Figure 11 is a view of the structure of Figures 8, 9 and 10, with the parts moved to open position.

The form of the invention illustrated in Figs. 1 to 4, comprises the relatively thick body links 5, and the thinner lock links 6, these two elements constituting the connector, and being pivoted to turn, with respect to each other, by rivets or like fastening devices 7.

In the form of the invention illustrated in Figures 1 to 4, the body link 5 is provided with two longitudinally extending slots 8 and 9, adjacent its opposite ends, which, when the device is in closed or locked position, align with correspondingly shaped slots 10 and 11, formed in the lock link 6. The slots 8 and 9 of the body link in Figure 1 communicate with laterally extending arcuate passages 12 and 13, of said body link. In like manner, the lock link (see Fig. 2) is provided with arcuate lateral passageways 14, 14$^a$, which leads from the slots 10 and 11 to the outer edge of said body link. The connector of Fig. 1 is utilized to connect the terminal end links of chain sections, indicated at 15 and 16, and it is apparent that with the chain, of which these links are a part, under tension, and with the links held in the outer ends of the slots of the connector, said links will themselves prevent movement of the body and lock links of the connector out of alignment with each other. In other words, the presence of the links 15 and 16 holds the connector in locked position. If it be desired to disconnect the chain, this may be effected by moving the links 15 and 16 toward each other until their inner ends come into alignment with the slots 12, 13 and 14—14$^a$. The body and lock links of the connector may then be moved to the open position illustrated in Figure 4. When the parts have been moved to the open position illustrated in Figure 3, it will be apparent that the chain links 15 and 16 may be completely disconnected from the connector.

Thus, it will be seen that this form of the invention provides a universal connector adapted to connect chain links of any kind or character, and may be made in widely varying sizes.

The form of the invention illustrated in Figures 5, 6 and 7 is very similar to the form illustrated in Figures 1 to 4, differing therefrom in that, while the lock link 6$^a$ is like the corresponding link of Figure 1, the body link 5$^a$ is provided with a completely closed slot 11$^a$, at one end, while, in other respects, it corresponds to the body link of Figure 1. Thus, the lefthand chain link 16$^a$, in Figure 5, cannot be disconnected from the body link and, consequently, the connector, when moved to the open position illustrated in Figure 7, will still be anchored on one section of the chain while permitting the other section of the chain to be removed through the opening X. This is an important and highly advantageous feature, in that it prevents the connector from being lost off of the end of the chain, and since the device of the present invention, and particularly the form illustrated in Figures 5 to 7, is particularly adapted for use in connecting the ends of the non-skid chains of automobiles, it follows that it is highly important to prevent the connectors from dropping off of the chains, when they are released. These chains are usually used, either in mud or snow, and if the connectors can drop off when released, they would quickly become lost.

In the form of the invention illustrated in Figures 1 to 7, the lock links function along with the body links, as pulling or strain-taking elements, while in the form of the invention illustrated in Figures 8 to 11, the lock link $6^b$ is provided with a longitudinal slot 18, at one end, which opens at the end of the link. Otherwise, the structure is the same as that illustrated in Figures 5 to 7. That is to say, the body link $5^b$ is provided with a closed slot $10^b$, which permanently retains the chain link $16^b$. The formation of the slot 18 in the manner shown, facilitates the disengagement of the other chain link from the locking link, and in this form of the invention all of the pulling strain at one end of the structure is taken by the body link.

From the foregoing description it will be seen that the connector of the present invention is made of only two parts, of such a simple nature that they may be turned out in quantities very rapidly and at a very low cost, while the completed structure is of such a nature that it may be easily and quickly manipulated for the purposes set forth.

Having described my invention, what I claim is:

1. A chain link connector comprising a body link and a lock link pivotally connected to each other at substantially their central portions, each having an elongated slot adjacent each end thereof in a position to align with the corresponding slot of the other, lateral passageways extending from the inner portions of the slots of one of said members to the outer edge thereof, and a lateral passageway extending from the inner end of one of the slots of the other member to the outer edge thereof, the periphery of the other slot of the last named member presenting a continuous wall, all of the other slots being formed by return bend portions of the links adapted to positively engage and exert a pull upon the chain links which they connect.

2. A chain link connector comprising a body link and a lock link pivotally connected to each other at substantially their central portions, each having an elongated slot adjacent one end thereof, adapted to align with the corresponding slot of the other, the inner ends of said slots connecting with lateral passageways which extend to the sides of the respective links, one of said links being provided adjacent its other end with a closed elongated slot, and the other link being provided adjacent its end with an elongated slot, which opens at the end of the link.

3. A chain link connector, comprising a body link and a lock link pivotally connected to each other at substantially their central portions, each of said links being of elongated formation and having substantially straight sides and each of said links having an elongated slot formed therein, adjacent each end thereof, and in a position to align with the corresponding slot of the other, said links being further provided with arcuate slots concentric with the pivotal connection between said links, which extend from the outer edges of said links to and communicate with the first named elongated slots, said arcuate slots communicating with the inner ends of the elongated slots which leaves inturned hook-like portions which positively engage the links to be connected, while permitting the free lateral displacement of the chain links through the arcuate slots when the connector links are swung to positions approximately at right angles with respect to each other.

4. A chain link connector comprising a body link and a locking link, pivotally connected to each other at substantially their central portions, each having an elongated slot adjacent each end thereof in a position to align with a corresponding slot of the other, arcuate passageways concentric with the front point of the links extending from the rear portions of said elongated slots of one of said links to the side edges of said link, an arcuate passageway concentric with the pivot of the links extending from the rear end of one of the slots of the other of said links to the side edge of the last named link, the remaining slot of said link being completely closed, and a chain link engaged in said closed slot and adapted to pass through the arcuate slot of the companion link and to be moved longitudinally in the elongated slot of said companion link to hold the two links in alignment with each other as long as the chain link is at the outer end of the closed slot.

In testimony whereof I affix my signature.

SIDNEY D. PORT.